(12) United States Patent
Tran et al.

(10) Patent No.: US 10,148,610 B2
(45) Date of Patent: Dec. 4, 2018

(54) METHOD TO PUBLISH REMOTE MANAGEMENT SERVICES OVER LINK LOCAL NETWORK FOR ZERO-TOUCH DISCOVERY, PROVISIONING, AND MANAGEMENT

(71) Applicant: Dell Products L.P., Round Rock, TX (US)

(72) Inventors: Trung M. Tran, Round Rock, TX (US); Muhammad Rahman, Round Rock, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 281 days.

(21) Appl. No.: 14/503,739

(22) Filed: Oct. 1, 2014

(65) Prior Publication Data
US 2015/0019759 A1  Jan. 15, 2015

Related U.S. Application Data

(63) Continuation-in-part of application No. 13/776,855, filed on Feb. 26, 2013, now Pat. No. 9,043,492.

(51) Int. Cl.
*G06F 15/16* (2006.01)
*H04L 29/12* (2006.01)
*H04L 12/24* (2006.01)

(52) U.S. Cl.
CPC ...... *H04L 61/2038* (2013.01); *H04L 41/0886* (2013.01); *H04L 41/5058* (2013.01); *H04L 61/1511* (2013.01); *H04L 61/1541* (2013.01)

(58) Field of Classification Search
CPC ... H04L 67/16; H04L 61/1511; H04L 61/2514

USPC .......................................................... 709/245
See application file for complete search history.

(56) References Cited

U.S. PATENT DOCUMENTS

| | | | |
|---|---|---|---|
| 2002/0003780 A1* | 1/2002 | Braun | ..................... H04L 45/02 370/254 |
| 2007/0220301 A1* | 9/2007 | Brundridge | ......... G06F 11/2028 714/4.1 |
| 2008/0147885 A1* | 6/2008 | Bessis | ............... H04L 29/12066 709/250 |

(Continued)

OTHER PUBLICATIONS

Brundridge et al. "Remotely Managing the Dell PowerEdge 1855 Blade Server Using the DRAC/MC", Feb. 2005, http://www.dell.com/downloads/global/power/ps1q05-20040207-Brundridge.pdf.*

(Continued)

*Primary Examiner* — Mohamed A Wasel
*Assistant Examiner* — Patrick F Ngankam
(74) *Attorney, Agent, or Firm* — Terrile, Cannatti, Chambers & Holland, LLP; Stephen A. Terrile

(57) ABSTRACT

A system, method, and computer-readable medium are disclosed for using Zero Configuration Networking (ZeroConf) to automate the discovery of the Internet Protocol (IP) network address of a remote access controller (RAC). A RAC service associated with a networking device is registered programmatically or as a result of receiving user input to a command line interface. Available services that include the registered RAC service are browsed, followed by resolving the registered RAC service to an IP address, which is then discovered. The discovered IP address is then displayed within a user interface (UI) window.

19 Claims, 6 Drawing Sheets

(56) References Cited

U.S. PATENT DOCUMENTS

2011/0158088 A1* 6/2011 Lofstrand .............. G06F 9/465
 370/229
2014/0160225 A1* 6/2014 Baldelli ................ H04N 7/142
 348/14.08

OTHER PUBLICATIONS

Dell: "Dell® Auto-Discovery Network Setup Specification", Version 1.0.0, Sep. 21, 2009, http://wikifoundryattachments.com/xBUIrs4t+2TzbrwqYkblvQ==262254.*

Dell: "Dell Auto-Discovery Network Setup Specification", Version 1.0.0, Sep. 21, 2009, http://wikifoundryattachment.com/xBUIrs4t+2TzbrwqYkblvQ==262254.*

Cheshire et al.: "Zero Configuration Networking: The Definitive Guide", Dec. 2005 http://ommolketab.ir/aaf-lib/6429sutwymieo6db64h8t0tbavz3z7.pdf.*

Brundridge et al.: "Remotely Managing the Dell PowerEdge 1855 Blade Server using the DRAC/MC", Feb. 2005 http://www.dell.com/downloads/global/power/ps1q05-20040207-Brundridge-SOE.pdf.*

Dell, "Dell® Auto-Discovery Network Setup Specification", http://wikifoundryattachments.com/xBUIrs4t+2TzbrwqYkblvQ==262254 (Year: 2009).*

Brundridge et al. "Remotely Managing the Dell PowerEdge 1855 Blade Server using the DRAC/MC", Feb. 2005, http://www.dell.com/downloads/global/power/ps1q05-20040207-Brundridge-SOE.pdf (Year: 2005).*

* cited by examiner

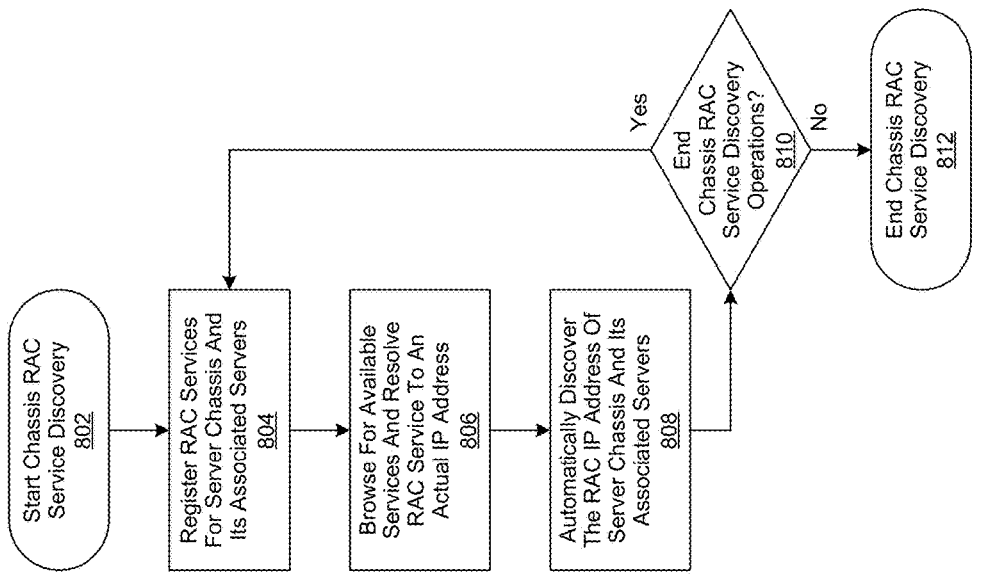

METHOD TO PUBLISH REMOTE MANAGEMENT SERVICES OVER LINK LOCAL NETWORK FOR ZERO-TOUCH DISCOVERY, PROVISIONING, AND MANAGEMENT

RELATED PATENT APPLICATION

This application is a continuation-in-part of U.S. patent application Ser. No. 13/776,855, filed on Feb. 26, 2013, entitled "Method to Publish Remote Management Services over Link Local Network for Zero-Touch Discovery, Provisioning and Management," by inventors Harikrishnan A. R. and Trung M. Tran, which describes exemplary methods and systems and is incorporated by reference in its entirety.

BACKGROUND OF THE INVENTION

Field of the Invention

The present invention relates to the management of information handling systems. More specifically, embodiments of the invention provide a system, method, and computer-readable medium for using Zero Configuration Networking (ZeroConf) to automate the discovery of the Internet Protocol (IP) network address of a remote access controller (RAC).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a server, which is typically dedicated to running one or more services as a host on a network. The advent of cloud computing in recent years has made the use of servers increasingly common. As a result, it is not unusual for hundreds, if not thousands, of servers to be deployed in a given data center. Historically, servers were locally managed by an administrator through a shared keyboard, video display, and mouse (KVM). Over time, remote management capabilities evolved to allow administrators to monitor, manage, update and deploy servers over a network connection.

One example of these capabilities is the use of a remote access controller (RAC), which is operably coupled to, or embedded within, the server and remotely accessed by an administrator via an out-of-band communication link. As an example, the Integrated Dell Remote Access Controller (iDRAC) from Dell, Inc. has its own processor, memory, network connection, and access to the system bus. Integrated into the motherboard of a server, it provides out-of-band management facilities that allow administrators to deploy, monitor, manage, configure, update, troubleshoot and remediate the server from any location, and without the use of agents. As an example, multiple servers (e.g., blade servers) may be associated with a server chassis.

Accordingly, the use of a RAC for remote management of a server, or multiple servers associated with a server chassis, in a data center can be advantageous. However, it can also present challenges. For example, new servers usually arrive with default IP network address settings that have been set during the manufacturing process. However, each data center may have implemented predetermined network global settings requirements in order to provide a valid routable IP address for each RAC. As a result, an administrator may have to resort to manually determining the predetermined IP address for the RAC through the server's front panel controls before it can be remotely accessed for further administration. It will be appreciated that such approaches can be inconvenient, time consuming, and error-prone, especially when onboarding large numbers of servers.

SUMMARY OF THE INVENTION

A system, method, and computer-readable medium are disclosed for using Zero Configuration Networking (ZeroConf) to automate the discovery of the Internet Protocol (IP) network address of a remote access controller (RAC). In various embodiments, a RAC service associated with a networking device is registered. Available services that include the registered RAC service are browsed, followed by resolving the registered RAC service to an IP address, which is then discovered.

In various embodiments, the browsing is performed within a user interface (UI) window. In certain embodiments, the available services and the discovered IP address is displayed within the UI window. In various embodiments, the network device may be a server, a server chassis, a host system, or a network peripheral. In certain embodiments, the server chassis is associated with at least one server. In these embodiments, the RAC IP address of the chassis server and the RAC IP address of the at least one server are discovered. In one embodiment, the registering is performed in response to user input to a command line interface. In another embodiment, the registering is performed in programmatically.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 8 is a generalized flowchart of the performance of RAC service discovery operations to automatically discover the RAC IP address of a server chassis and each of its associated servers; and FIG. 9 shows the display of automatically-discovered RAC service information associated with a server chassis and each of its associated servers within a UI window.

DETAILED DESCRIPTION

A system, method, and computer-readable medium for using Zero Configuration Networking (ZeroConf) to automate the discovery of the Internet Protocol (IP) network address of a remote access controller (RAC). For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
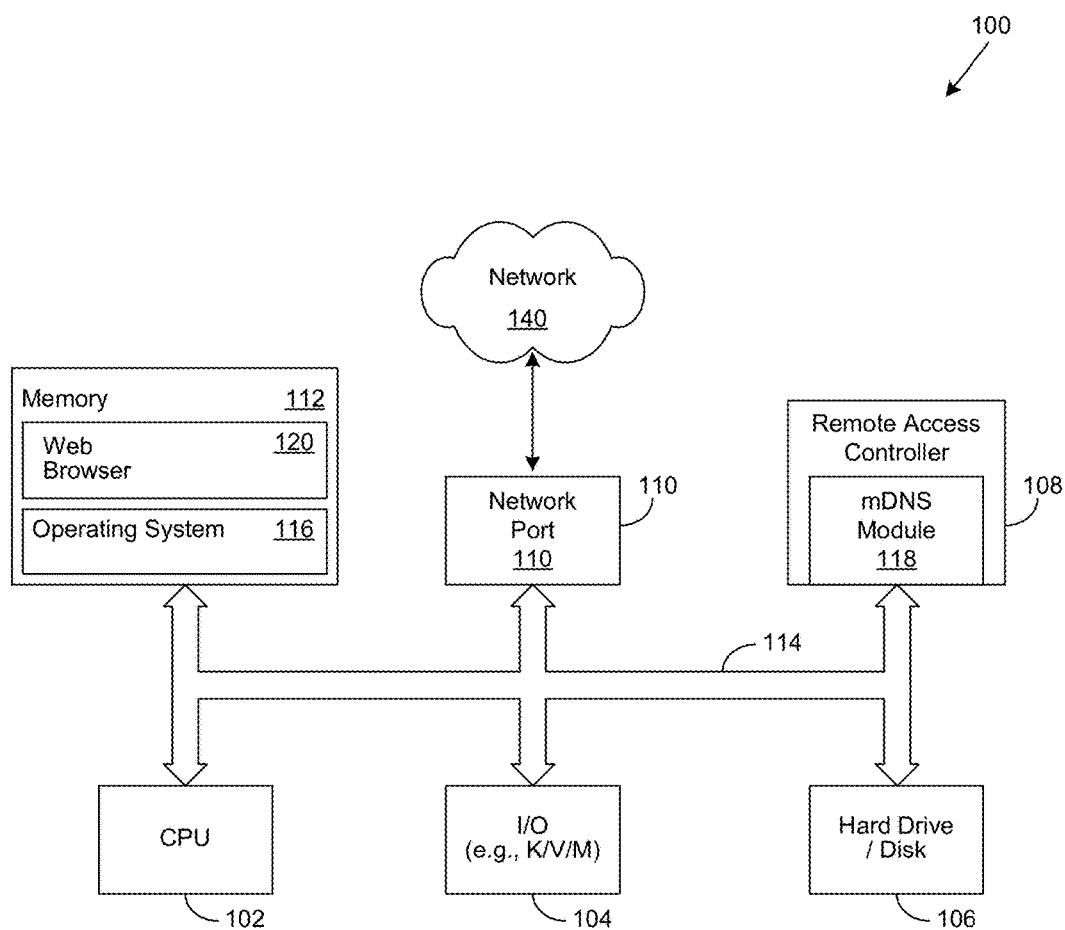
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems, such as a remote access controller (RAC) 108. In various embodiments, the RAC 108 includes a Multicast Domain Name System (mDNS) module 118. In one embodiment, the mDNS module 118 is operatively coupled to the RAC 108. In one embodiment, the mDNS module 118 is embedded in the RAC 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a web browser 120.

Figure 2:
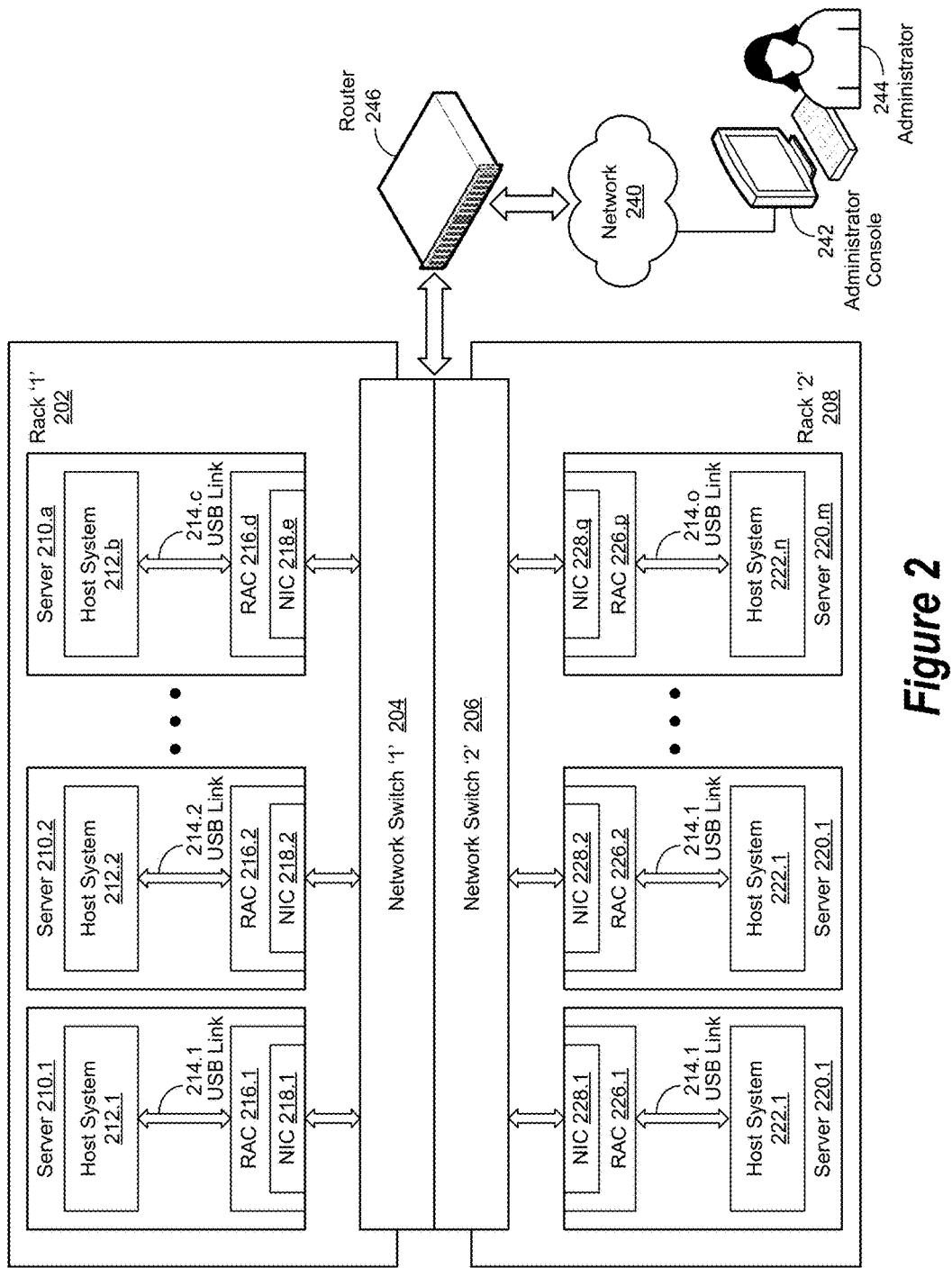
FIG. 2 is a simplified block diagram of a plurality of remote access controllers (RACs) implemented with a corresponding plurality of servers.

FIG. 2 is a simplified block diagram of a plurality of remote access controllers (RACs) implemented with a corresponding plurality of servers in accordance with an embodiment of the invention. As shown in FIG. 2, server rack '1' 202, such as a server chassis, includes a network switch '1' 204 and servers 210.1 and 210.2 through 210.$a$, where 'a' is an integer index greater than or equal to 2. In one embodiment, the servers 210.1 and 210.2 through 210.$a$ respectively include a host system 212.1 and 212.2 through 212.$b$ and a RACs 216.12 and 216.2 through 216.$d$, where 'b' and 'd' are integer indexes greater than or equal to 2. In one embodiment, the host systems 212.1 and 212.2 through 212.$b$ are respectively coupled to the RACs 216.1 and 216.2 through 216.$d$ via Universal Serial Bus (USB) links 214.1 and 214.2 through 214.$c$, where 'c' is an integer index greater than or equal to 2. In one embodiment, the RACs 216.1 and 216.2 through 216.$d$ are respectively embedded in the servers 210.1 and 210.2 through 210.$a$. In one embodiment, the RACs 216.1 and 216.2 through 216.$d$ respectively include a Network Interface Controller (NIC) 218.1 and 218.2 through 218.$e$, where 'e' is an integer index greater than or equal to 2. In one embodiment, the NICs 218.1 and 218.2 through 218.$e$ are used to respectively couple the RACs 216.1 and 216.2 through 216.$d$ to the network switch 'a' 204.

Server rack '2' 208 likewise includes a network switch '2' 206 and servers 220.1 and 220.2 through 220.$m$, where 'm' is an integer index greater than or equal to 2. In one embodiment, the servers 220.1 and 220.2 through 220.$m$ respectively include a host system 222.1 and 222.2 through 222.$n$ and RACs 226.1 and 226.2 through 226.$p$, where 'n' and 'p' are integer indexes greater than or equal to 2. In one embodiment, the host systems 222.1 and 222.2 through 222.$b$ are respectively coupled to the RACs 226.1 and 226.2 through 226.$p$ via USB links 224.1 and 224.2 through 224.$o$, where 'o' is an integer index greater than or equal to 2. In one embodiment, the RACs 226.1 and 226.2 through 226.$p$ are respectively embedded in the servers 220.1 and 220.2 through 220.$m$. In one embodiment, the RACs 226.1 and 226.2 through 226.$p$ respectively include a NIC 228.1 and 228.2 through 228.$q$, where 'q' is an integer index greater than or equal to 2. In one embodiment, the NICs 228.1 and 228.2 through 228.$q$ are used to respectively couple the RACs 226.1 and 226.2 through 226.$p$ to the network switch 'b' 206.

In one embodiment, network switch '1' 201 and network switch '2' 206 are communicatively coupled to respectively exchange data between servers 210.1 and 210.2 through 210.$a$ and servers 220.1 and 220.2 through 220.$m$. In one embodiment, the network switches '1' 204 and '2' 206 are communicatively coupled via a router 246 to a link-local network 240. In one embodiment, the link-local network 240 is also communicatively coupled to an administrator console 242, which is used by an administrator 244 to administer RACs 216.1 and 216.2 through 216.$d$ and RACs 226.1 and 226.2 through 226.$p$. In one embodiment, each of the RACs 216.1 and 216.2 through 216.$d$ and RACs 226.1 and 226.2 through 226.$p$ are assigned a unique link-local Internet Protocol (IP) address by the administrator 244.

As used herein, a link-local network refers to a private network that uses a private IP address space. These addresses are commonly used enterprise local area networks (LANs) when globally routable addresses are either not mandatory, or are not available for the intended network applications. These addresses are characterized as private because they are not globally delegated and IP packets addressed by them cannot be transmitted onto the public Internet. As the name implies, a link-local network uses link-local addresses, which refers to an IP address that is intended only for communications within a segment, or link, of a local network, or to establish a point-to-point network connection to a host.

Routers, such as router 246, do not forward packets with link-local IP addresses. Link-local IP addresses may be assigned manually by an administrator or by operating system procedures. They may also be assigned using stateless address autoconfiguration. In IPv4, their normal use is typically restricted to the assignment of IP addresses to network interfaces when no external, stateful mechanism of address configuration exists, such as the Dynamic Host Configuration Protocol (DHCP), or when another primary configuration method has failed. In IPv6, link-local addresses are generally utilized for the internal functioning of various protocol components.

Figure 3:
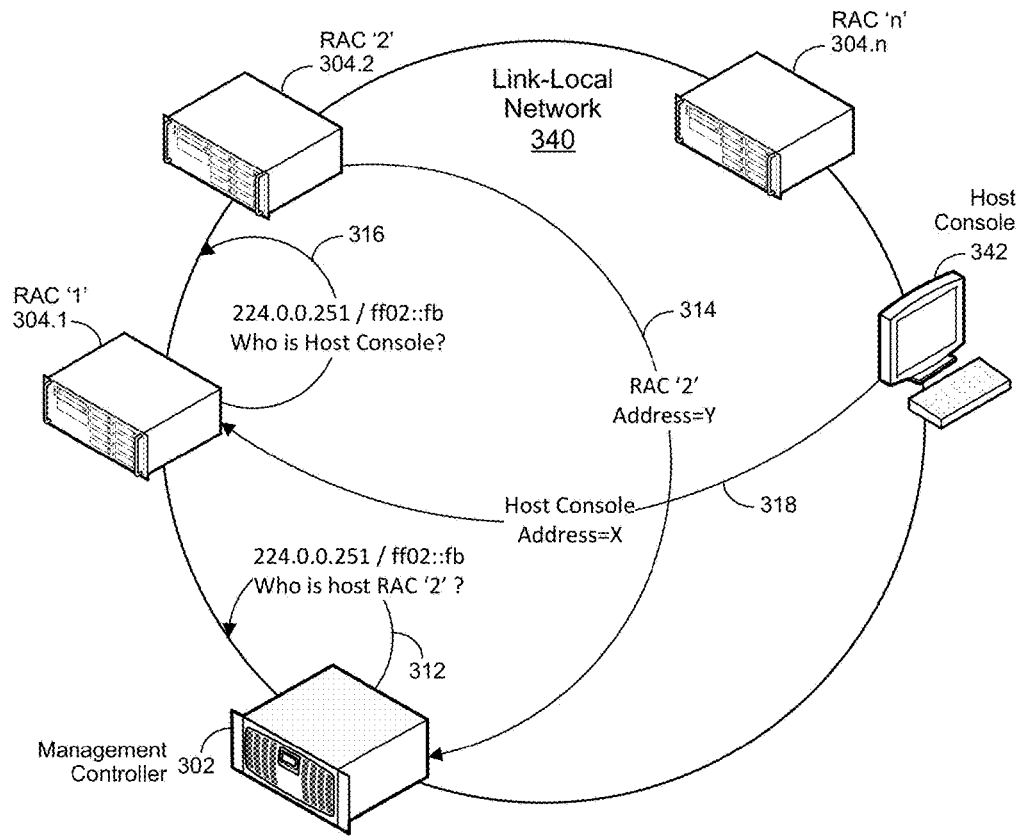
FIG. 3 is a simplified network diagram showing the implementation of the Multicast Domain Name System (mDNS) protocol in a link-local network.

FIG. 3 is a simplified network diagram showing the implementation of the Multicast Domain Name System (mDNS) protocol in accordance with an embodiment of the invention in a link-local network. Skilled practitioners of the art will be aware that mDNS provides a way of using familiar DNS programming interfaces, packet formats, and operating semantics in a small network without configuring a conventional DNS server. As such, it is useful in small networks that do not include a DNS server, yet it can also co-reside in network environments that do. In typical implementations, mDNS functionality is provided using IP multicast over User Datagram Protocol (UDP).

Using mDNS allows a client to determine the IP address of a target host (e.g., a host name) without the direct help of a centralized DNS server. To do so, the client machine sends an mDNS IP multicast query message to all hosts that share its local network, such as link-local network 340. In response, the target host replies with a multicast message announcing itself and its IP address. With this response, all machines in the subnet can update their mDNS cache with the target host's information. Those of skill in the art will also be familiar with the DNS-based Service Discovery (DNS-SD) protocol, which can be used to discover services provided by a host on a network. The hosts that offer these services publish details of available services, such as instance, service type, domain name and optional configuration parameters. Once discovered, DNS-SD allows a list of hosts providing a given service to be built.

In various embodiments, mDNS is used in combination with DNS-SD over a link-local network 340 to identify host names of interest and different services hosted upon them. In these various embodiments, an mDNS IP multicast query message is combined with the DNS-SD message to generate an mDNS/DNS-SD query message, which is then sent to all devices on the link-local network 340. In response, the various devices respond with the services they respectively provide. As a result, it is no longer necessary to associate services hosted by a RAC or a console with a routable IP address. Furthermore, various embodiments allow a link-local network to represent a collection of services that are available for subscription.

Referring now to FIG. 3, a management controller 302, remote access controllers (RACs) '1' 304.1 and '2' 304.2 through 'n' 304.n, where 'n' is an integer index greater than or equal to 2, and host console 342 are communicatively coupled via a link-local network 340. As shown in FIG. 3, the management controller 302 generates an mDNS IP multicast query message 312 (e.g., IP address 224.0.0.251/ff02::fb) to all hosts on the link-local network 340 to discover the IP address for RAC '2' 304.2. In response, RAC '2' 304.2 responds with an mDNS IP multicast response message Address='Y' 314, where 'Y' is the link-local IP address for RAC '2' 304.2. As likewise shown in FIG. 3, RAC '1' 304.1 generates an mDNS IP multicast query message 316 (e.g., IP address 224.0.0.251/ff02::fb) to all hosts on the link-local network 340 to discover the IP address for the host console 342. In response, the host console 342 responds with an mDNS IP multicast response message Address='X' 318, where 'X' is the link-local IP address for the host console 342.

From the foregoing, it will be appreciated that the implementation of mDNS allows all participating network devices on the link-local network 340 to perform standard DNS operations without the need of implementing a unicast DNS server. It will likewise be appreciated that the implementation of mDNS in accordance with the described embodiments reduces the need to manually update and maintain the link-local IP addresses corresponding to host names of devices on the link-local network 340.

Figure 4:
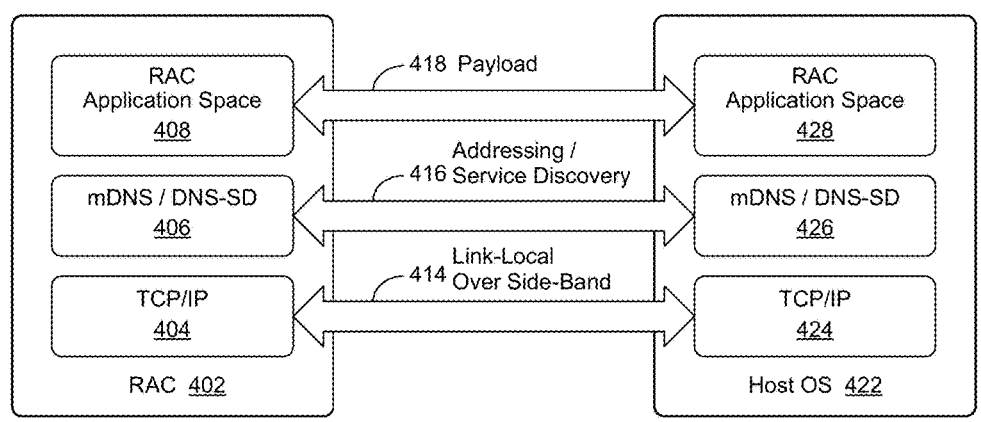
FIG. 4 is a simplified block diagram of the implementation of the mDNS and DNS Service Discovery (DNS-SD) protocols with a host operating system (OS) within the same physical server.

FIG. 4 is a simplified block diagram of the implementation of the Multicast Domain Name System (mDNS) and DNS Service Discovery (DNS-SD) protocols with a host operating system (OS) within the same physical server in accordance with an embodiment of the invention. In this embodiment, remote access controller (RAC) 402 includes a TCP/IP stack 404, an implementation of the mDNS and DNS-SD protocols 406, and a RAC application space 408. In one embodiment, the mDNS and DNS-SD protocols 406 are implemented in the RAC's 402 firmware. As shown in FIG. 4, the host OS 422 likewise includes a TCP/IP stack 424, an implementation of the mDNS and DNS-SD protocols 426, and a RAC application space 428.

In this and other embodiments, link-local data 414 is exchanged over a side-band network communications link between the RAC 402 and the Host OS 422 through their respective TCP/IP stacks 402 and 422. Likewise, IP address and service discovery data 416 is exchanged between the RAC 402 and the Host OS 422 through their respective mDNS/DNS-SD protocol implementations 406 and 426. RAC payload data is likewise exchanged between the RAC 402 and the Host OS 422 through their respective RAC application spaces 408 and 428. It will be appreciated that such embodiments provide the ability to access RAC services such as web-interface, command line interfaces, and so forth, from the local host by directly entering a service name in the .local space rather than specifying the IP address or host name of the device.

Figure 5:
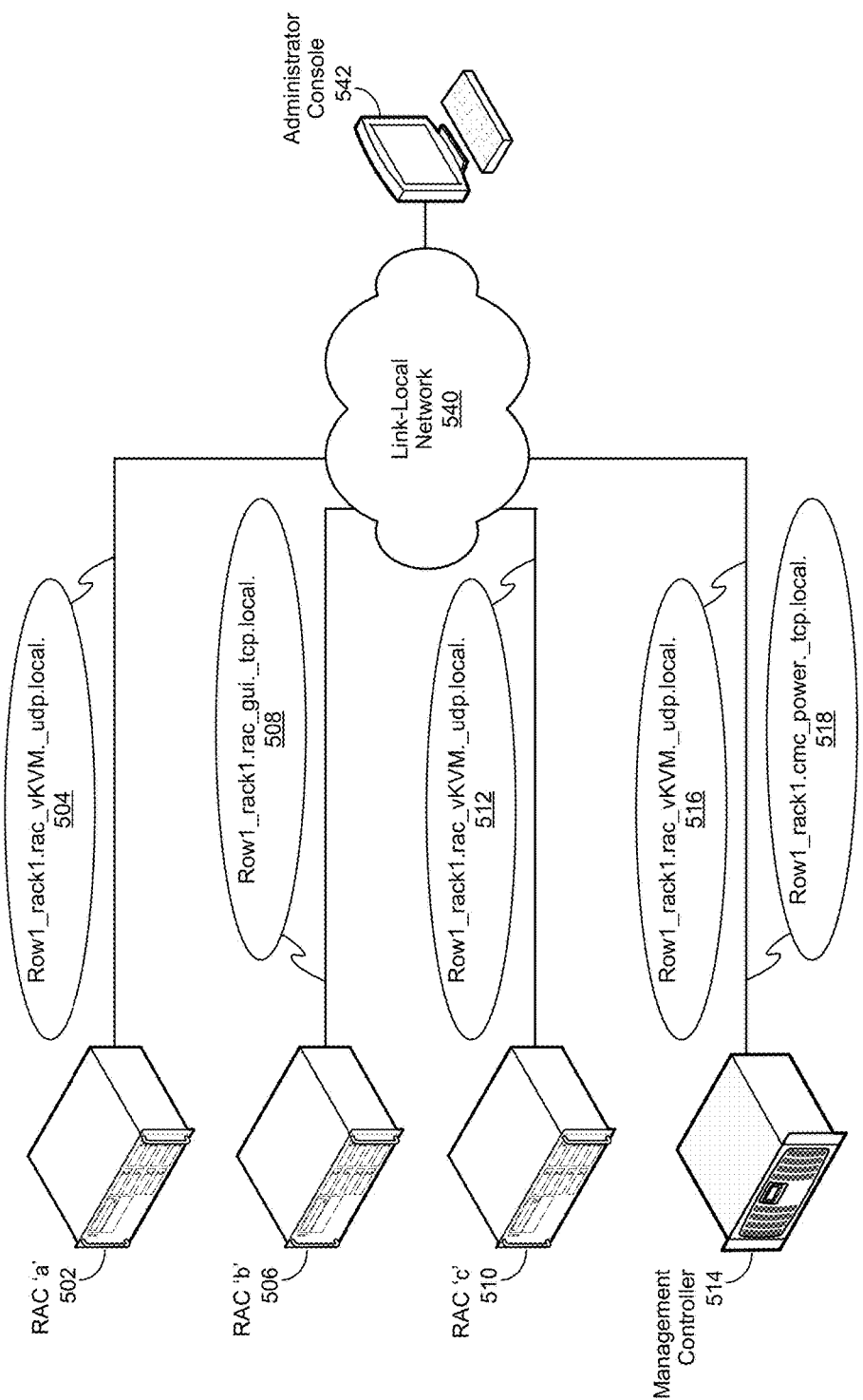
FIG. 5 is a simplified network diagram showing the implementation of the mDNS and DNS-SD protocols on a link-local network for the discovery of management functions provided as a service.

FIG. 5 is a simplified network diagram showing the implementation of the Multicast Domain Name System (mDNS) and DNS-based Service Discovery (DNS-SD) protocols on a link-local network in accordance with an embodiment of the invention for the discovery of management functions provided as a service. In this embodiment, remote access controllers (RACs) 'a' 502, 'b' 506, and 'c' 510 are communicatively coupled to one another, along with a management controller 514 and an administrator console 542 via link-local network 540. In this and other embodiments, as described in greater detail herein, mDNS and DNS-SD protocols are implemented in conjunction with one another to discover management functions provided as a service by devices communicatively coupled to the link-local network 540.

As shown in FIG. 5, RACs 'a' 502, 'b' 506, and 'c' 510 respectively respond to an mDNS/DNS-SD query message with management function as a service responses "Row1_rack1.rac_vKVM._udp.local." 504, "Row1_rack1.rac_gui_tcp.local." 508, and "Row1_rack1.rac_vKVM._udp.local." 512. Likewise, the management controller 514 responds with management function as a service responses "Row1_rack1.rac_vKVM._udp.local." 516, and "Row1_rack1.cmc_power._tcp.local." 518.

In various embodiments, the management function as a service can be discovered through the implementation of mDNS/DNS-SD messages from RAC-to-RAC, RAC-to-consoles, or applications hosted by various operating systems. In these embodiments, each device communicatively coupled to the link-local network 540 would respond with its host name and link-local IP address, which will be cached in DNS query database of the request originator for future reference. From that point forward, the desired host can be easily reachable using the IP address until an IP reconfiguration occurs, in which case the preceding steps of host name and IP address rediscovery are repeated.

In certain embodiments, the described embodiments can be further expanded by integrating mDNS and DNS-SD services in conjunction with various management consoles that are deployed with the link-local network 540. As a result, the management console would be able to discover all newly-added RACs even before a valid global IP address was assigned to it. After discovering newly-added RAC interface link-local IP address, the most suitable RAC configuration file can then be sent by the console to each individual RAC. Skilled practitioners will recognize that the unlike existing auto discovery approaches, the embodiments described in greater detail herein do not require an external provisioning server or DHCP server to deliver their respective functionality.

As likewise described in greater detail herein, a console (e.g., administrator console 542) implemented with the mDNS/DNS-SD capabilities can be deployed in the link-local network 540 to discover the list of host names that are being added. As a result, the console would be able to communicate with the newly-added devices using their link-local IP addresses, even though those IP addresses were not previously stored in the consoles DNS cache. Thereafter, upon receiving any new network settings from the console, the device can apply any new settings provided by the console.

In one embodiment, if an integrated RAC 'a' 502, 'b' 506, and 'c' 510 loses its license, such as through the replacement of its respective motherboard, its interface can be configured such that it can run on its link-local address. The administrator console 542 can then upload a previously backed-up license file based on the service tag of the RAC's corresponding server. Once the license is applied, the RAC can also be restored such that a motherboard replacement will be transparent for all other applications and consoles using the integrated RAC services for managing that server. In another embodiment, the importation of license data is realized by permitting link-local traffic on the dedicated network port only for license import network setting import operations. As a result, the license for the dedicated port can still be enforced for remote consoles and applications, but can take advantage of loading the license without customer intervention to a large group of servers.

From the foregoing, skilled practitioners of the art will recognize that the invention can facilitate the implementation of data center system management policies without the use of a centralized monitoring environment. For example, administrator can optimize the power utilization of a data center by sending a predetermined power utilization value to each RAC on the link-local IP network. Upon receiving this value, each RAC can respectively provide the real-time power utilization values of its associated server with other servers. Furthermore, software logic within each RAC can make intelligent power throttling decisions to limit power consumption by combining power utilization values received from other RACs. Moreover, other parameters such as the server's current processing load can be incorporated to comply with the data center's global power utilization policy.

Figure 6:
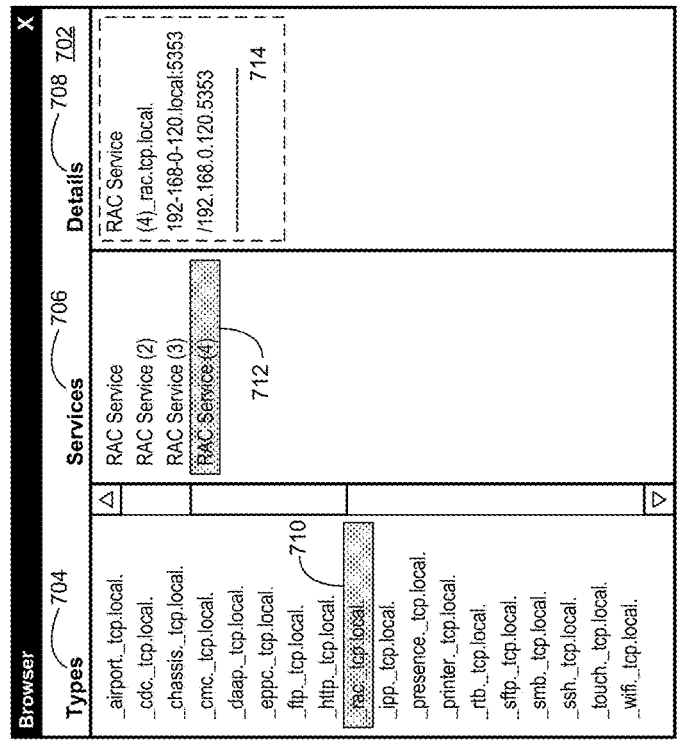
FIG. 6 is a generalized flowchart of the performance of RAC service discovery operations to automatically discover the RAC Internet Protocol (IP) address of a server.

FIG. 6 is a generalized flowchart of remote access controller (RAC) service discovery operations performed in accordance with an embodiment of the invention to automatically discover the RAC Internet Protocol (IP) address of a server. In various embodiments, Zero Configuration Networking (ZeroConf) is implemented to reduce, or even eliminate, the need for user involvement when discovering the RAC IP address of servers or other network devices. In certain embodiments, ZeroConf is likewise implemented to facilitate the discovery of RAC IP addresses by known system management applications.

Those of skill in the art will be familiar with ZeroConf, which is a methodology and a set of technologies that automatically creates a usable computer network based upon the Internet Protocol Suite (TCP/IP) when computers or network peripherals are interconnected. One aspect of Zero-Conf is its ability to automatically configure devices on a local network by allowing a system (e.g., a server or host) or a device to be added to a local network and then automatically obtain an IP address without the use of a Dynamic Host Configuration Protocol (DHCP) server. Those of skill in the art will likewise be familiar with DHCP, which is a common networking protocol used within IP networks for dynamically distributing network configuration parameters, such as IP addresses, for interfaces and services. With DHCP, computers and other devices are able to request IP addresses and networking parameters automatically from a DHCP server, thereby reducing the need for a network administrator or a user to manually configure such settings.

In various embodiments, the implementation of ZeroConf allows systems or devices to be discovered on a local network without any special configuration or centralized network management. Without ZeroConf, network administrators are presented with limited device configuration options, which include setting up services such as DHCP and Domain Name System (DNS), or manually configuring each device's network settings. ZeroConf avoids the need for such services or manual operations by inherently providing the following functional capabilities:

address selection, through the automated assignment of numeric network addresses for networked devices name resolution, through automatic distribution and resolution of computer host names service discovery, through automatic location of network services These functional capabilities of ZeroConf are enabled by the implementation of IPv4 and IPv6 link-local addressing, Multicast Name Resolution (mDNS), and DNS Service Discovery (DNS-SD).

Current known examples of ZeroConf implementations include Bonjour®, available from Apple, Inc. of Cupertino, Calif., and Java® MultiCast DNS (JmDNS), available from Oracle Corporation, of Redwood Shores, Calif. Currently, Bonjour® consists of the mDNSResponder daemon and the multicast DNS service discovery library to interface with the daemon. Further, Bonjour® provides dns_sd.jar whereas JmDNS provides its own jmdns.jar.

As described in greater detail herein, current approaches to configuring the IP address of a RAC typically involve manually assigning, or automatically obtaining, an IP address. As an example, a system administrator may use a command line or other interface to assign a static IP address to a RAC. Alternatively, DHCP may be used to automatically obtain an IP address for a RAC. However, manually configuring the IP address of a RAC can become time consuming, tedious and expensive in a large datacenter or enterprise, where a valid RAC IP address needs to be assigned or obtained for hundreds or even thousands of systems. Likewise, discovering the RAC IP address for hundreds of systems can prove to be cumbersome for known system management applications, such as OpenManage Integration for VMware vCenter® or Active System Manager®, both available from Dell, Inc. of Round Rock, Tex.

For example, such administrative applications typically rely upon the https protocol (e.g., https://<ApplianceIP:443/wsman) and the winrm command in combination with DCIM_IPProtocolEndPoint command (e.g., winrm e cimv2/CIM_IPProtocolEndpoint -u:<user> -p:<pwd> -r:https://<hostIP>:443/wsman -SkipCNCheck -SkipCACheck -auth: basic -encoding:utf-8 -SkipRevocationCheck) to obtain the IP address of a given RAC. However, in certain cases this approach may return an invalid RAC IP address, such as 0.0.0.0 or 0.0.0.93. In other cases, this approach is unable to obtain the IP address of the RAC. As a result, such console applications are unable to use the RAC's IP address to retrieve data associated with a server or other device, such as warranty coverage, service tag number, model number, and so forth.

In various embodiments, ZeroConf is implemented to perform RAC service discovery operations by performing the following steps:
registering a service
browsing for available services and resolving the RAC service to an actual address
discovering the IP address of the RAC For example, in one embodiment, a server or host registers its services with a Bonjour® daemon. A client then browses for services to generate a list of services, which is then provided to the user. Finally, when it is time to connect to a service, the client resolves the selected service to an actual IP address and port, followed by using the TCP/IP protocol to connect to the provided service.

Referring now to FIG. 6, RAC service discovery operations are begun in step 602, followed by the registration of a RAC service in step 604. In one embodiment, a system informs and advertises its services to a daemon in the form of _name._protocol.domain. As an example, the system may use _rac._tcp._local. to register and advertise its RAC service. To further the example, the following table shows various services and their registration type (RegType), including a RegType of _rac.tcp.local. for a RAC service associated with a server:

| Service | RegType |
| --- | --- |
| createPDF | _pdf._tcp.local. |
| notifyServer | _telnet._tcp.local. |
| authServer | _telnet._tcp.local. |
| proxyServer | _telnet._tcp.local. |
| ssh | _ssh._tcp.local. |
| sftp | _sftp._tcp.local. |

-continued

| Service | RegType |
| --- | --- |
| ftp | _ftp._tcp.local. |
| dhcp | _ftp._tcp.local. |
| http | _http._tcp.local. |
| wifi | _wifi._tcp.local. |
| ichat | _ichat._tcp.local. |
| printer | _lpd._tcp.local. |
| rac | _rac._tcp.local. |

In various embodiments, registration of the RAC service may be done from the command line or programmatically. For example:
Command Line:

```
dns-sd -R "rac service" _rac._tcp local 5353
dns-sd -P _rac._tcp. local 5353 esxihost 192.168.1.10
```

Programmatically:

```
try {
JmDNS mdnsServer = null;
mdnsServer = JmDNS.create("localhost");
// Register a test service.
ServiceInfo RACService = ServiceInfo.create("_rac._tcp.local.", //
Type
"rac-service", // Name
5353, // Port
"rac service"); // Text
mdnsServer.registerService(RACService);
} catch (IOException e) {
e.printStackTrace( );
}
```

In various embodiments, the services associated with a device, such as a server, are registered whenever the device is added to a network. In certain embodiments, services associated with a device are registered whenever the services are implemented for the device. As an example, a new service may be added to a network device that has services that have been previously registered.

Browsing operations are then performed in step 606 to identify available services and resolve the RAC service to an actual IP address. In various embodiments, browsing for available services may be done from the command line or programmatically. For example:
Command Line:
dns-sd -B _rac._tcp
Programmatically:

```
public static class ServiceListenerClass implements ServiceListener {
public void serviceAdded(ServiceEvent event) {
event.getDNS( ).requestServiceInfo(event.getInfo( ).getServer( ),
event.getName( ), true);
}
public void serviceRemoved(ServiceEvent event) {
System.out.println((--count) + " " + event.getInfo( ).getName( ) );
}
public void serviceResolved(ServiceEvent event) {
System.out.println((++count) + " :Res: " +
event.getInfo( ).getName( ) + " " + event.getInfo( ).getPort( ) + " "
+ event.getInfo( ).getApplication( ) + " "
+ event.getInfo( ).getDomain( ) + " "
+ event.getInfo( ).getKey( ));
for (InetAddress address : event.getInfo( ).getInetAddresses( ))
System.out.println(address.getHostAddress( ));
}}
```

Then, in step 608, the IP address of the RAC is automatically discovered. As an example, the IP address of the RAC may be automatically discovered through the implementation of the following programmatic approach:

```
String HostIP;
InetAddress[ ] addresses = null;
if (args.length < 1)
    HostIP = "localhost";
else
    HostIP = args[0];
try {
} catch (UnknownHostException e) { }
for (InetAddress address : addresses) {
    System.out.println(address.getHostAddress( ));
}
```

Thereafter, a determination is made in step 610 whether to continue RAC service discovery operations. If so, then the process is continued, proceeding with step 604. Otherwise, RAC discovery operations are ended in step 612.

In various embodiments, Bonjour® and JmDNS are respectively implemented to send and receive network packets on UDP and TCP port 5353. Therefore, UDP port 5353, for Bonjour®, or TCP port 5353, for JmDNS, must be opened to allow them to work properly. However, certain firewalls will only partially block Bonjour packets. As a result, firewall settings are checked in various embodiments to verify that Bonjour® is listed as an exception and is allowed to receive incoming packets. In certain embodiments, Bonjour® is implemented to configure a Windows® firewall appropriately during installation on Windows® XP® Service Pack 2 and above.

For example, the following programmatic steps are performed in step 604 to register a RAC service:

```
RegisterRACService.java
import java.io.IOException;
import java.net.InetAddress;
import javax.jmdns.JmDNS;
import javax.jmdns.ServiceInfo;
public class RegisterRACService {
    public static void main(String[ ] args) {
        try {
            System.out.println("Register the RAC service from the Local Area Network");
            JmDNS mdnsServer = null;
            /*
             * Create RAC service
             */
            if (args.length == 1) {
                mdnsServer = JmDNS.create(args[0]); // Pass the HOSTIP to the program
            } else {
                InetAddress inetAddress = InetAddress.getByName("192.168.0.120");
                // InetAddress inetAddress = InetAddress.getByAddress(new byte[ ] { (byte)192, (byte)168, 0, 12});
                mdnsServer = JmDNS.create(inetAddress);
            }
            /*
             * Register RAC service.
             */
            ServiceInfo RACService = ServiceInfo.create("_idrac._tcp.local.",
                    "RAC Service", 5353, "rac service");
            mdnsServer.registerService(RACService);
        } catch (IOException e) {
```

-continued

```
            System.err.println("Exception occurred from registering the iDRAC Service " + e.getMessage( ));
            e.printStackTrace( );
        }
    }
}
```

Likewise, the following programmatic steps are performed in step 606 to browse available services and resolve a RAC service to an actual IP address:

```
ListRACService.java
import java.io.IOException;
import java.net.InetAddress;
import java.net.NetworkInterface;
import java.net.UnknownHostException;
import java.util.Enumeration;
import javax.jmdns.JmDNS;
import javax.jmdns.ServiceEvent;
import javax.jmdns.ServiceListener;
public class ListRACService {
    private static int count = 0;
    public static void main(String[ ] args) throws IOException {
        JmDNS jmdns = null;
        InetAddress address = null;
        String type = "_rac._tcp.local.";
        Enumeration<NetworkInterface> ifc = NetworkInterface.getNetworkInterfaces( );
        while (ifc.hasMoreElements( )) {
            NetworkInterface anInterface = ifc.nextElement( );
            if (anInterface.isUp( )) {
                Enumeration<InetAddress> addr = anInterface.getInetAddresses( );
                while (addr.hasMoreElements( )) {
                    if (!(address = addr.nextElement( )).isLoopbackAddress( )){
                        System.out.println("RAC IP " + address.getHostAddress( ));
                        break;
                    } else {
                    }
                }
            }
        }
        jmdns = JmDNS.create(address, type);
        jmdns.addServiceListener(type, new ServiceListenerClass( ));
    }
    public static class ServiceListenerClass implements ServiceListener {
        public void serviceAdded(ServiceEvent event) {
            event.getDNS( ).requestServiceInfo(event.getInfo( ).getServer( ),
                    event.getName( ), true);
        }
        public void serviceRemoved(ServiceEvent event) {
            System.out.println((--count ) + " " + event.getInfo( ).getName( ));
        }
        public void serviceResolved(ServiceEvent event) {
            String serviceUrl = event.getInfo( ).getURL( );
            System.out.println(serviceUrl);
            System.out.println( (++count) + " : Host Resolved: "
                    + event.getInfo( ).getName( ) + " "
                    + event.getInfo( ).getPort( ) + " "
                    + event.getInfo( ).getApplication( ) + " "
                    + event.getInfo( ).getDomain( ) + " "
                    + event.getInfo( ).getKey( ));
            for (InetAddress address : event.getInfo( ).getInetAddresses( ))
                System.out.println(address.getHostAddress( ));
        }
    }
}
```

Likewise, the following programmatic steps are performed in step 608 to automatically discover the IP address of a RAC:

```
DiscoverRACIP.java
import java.net.InetAddress;
import java.net.UnknownHostException;
    public class DiscoverRACIP {
        public static void main(String[ ] args) {
            String HostIP;
            InetAddress[ ] addresses = null;
            if (args.length < 1)
                HostIP = "localhost";
            else
                HostIP = args[0];
            try {
                addresses = InetAddress.getAllByName(HostIP);
            } catch (UnknownHostException e) { }
            for (InetAddress address : addresses) {
                System.out.println(address.getHostAddress( ));
            }
        }
    }
```

Those of skill in the art will realize while the Java language is used in the preceding examples, certain other computer languages, such as C.C++, may be implemented in various embodiments of the RAC service discovery steps depicted in FIG. 6. Skilled practitioners of the art will likewise recognize that the implementation of ZeroConf in the various embodiments described in greater detail herein provides an advantageous method of automatically assigning, and discovering, the IP address associated with a RAC without depending upon other applications or protocols. Likewise, while the embodiments described herein refer to discovering the IP address of a RAC, these same approaches may be extended to other systems, servers, handheld devices, tablets, SmartTV, SmartPhones, printers, network media, and so forth.

Figure 7:
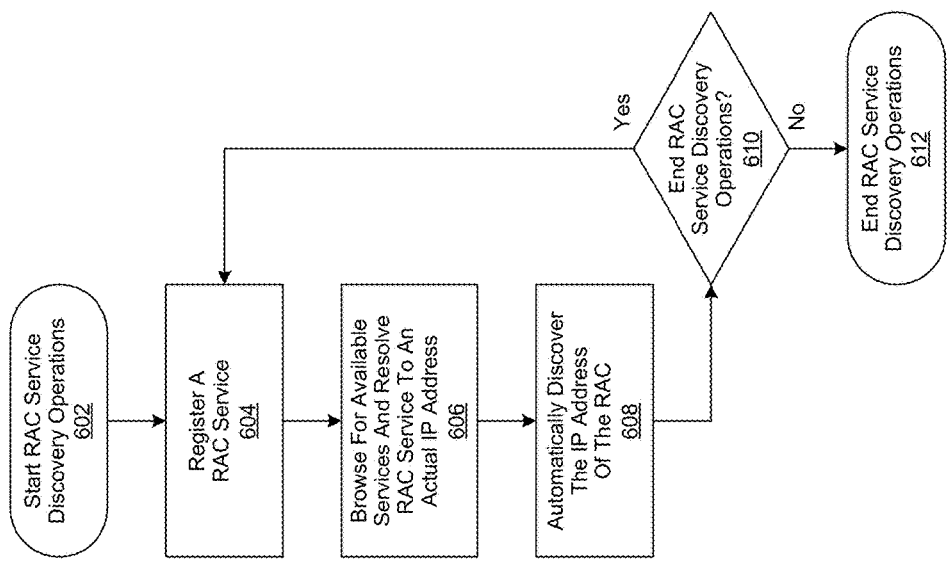
FIG. 7 shows the display of automatically-discovered RAC service information associated with a server within a user interface (UI) window.

FIG. 7 shows the display of automatically-discovered remote access controller (RAC) service information associated with a server within a user interface (UI) window implemented in accordance with an embodiment of the invention. In this embodiment, service types 704, associated services 706, and corresponding service details 702 are displayed within a UI window 702 as a result of performing the RAC service discovery operations described in the descriptive text associated with FIG. 6. For example, as shown in FIG. 7, _rac.tcp.local. 710 is one of several service types 704 registered in the process of performing the operations described in the descriptive text associated with step 604 of FIG. 6. Likewise, associated services 706 may be browsed as described in the descriptive text associated with step 606 of FIG. 6 to select a corresponding RAC service, such as "RAC service (4)" 712. By doing so, service details 714 associated with "RAC Service (4)" 712 are displayed within the UI window 702, such as its registration type (RegType) of "RAC Service (4) _rac.tcp.local." and its IP address details "192-168-0-120.local: 5353 /192.168.0.120.5353.

FIG. 8 is a generalized flowchart of remote access controller (RAC) service discovery operations performed in accordance with an embodiment of the invention to automatically discover the RAC Internet Protocol (IP) address of a server chassis and each of its associated servers. In this embodiment, RAC service discovery operations for a server chassis and each of its associated servers are begun in step 802, followed by the registration of a RAC service in step 804. In one embodiment, a system informs and advertises its services to a daemon in the form of _name._protocol.domain. As an example, the system may use _chassis._tcp._local. to register and advertise the RAC service for a server chassis as described in greater detail herein. To further the example, the following table shows various services and their registration type (RegType), including a RegType of _chassis.tcp.local. for a RAC service associated with a server chassis:

| Service | RegType |
| --- | --- |
| createPDF | _pdf._tcp.local. |
| notifyServer | _telnet._tcp.local. |
| authServer | _telnet._tcp.local. |
| proxyServer | _telnet._tcp.local. |
| ssh | _ssh._tcp.local. |
| sftp | _sftp._tcp.local. |
| ftp | _ftp._tcp.local. |
| dhcp | _ftp._tcp.local. |
| http | _http._tcp.local. |
| wifi | _wifi._tcp.local. |
| ichat | _ichat._tcp.local. |
| printer | _lpd._tcp.local. |
| chassis | _chassis.tcp.local. |

As described in greater detail herein, registration of the RAC service associated with a server chassis and each of its associated servers may be done in various embodiments from the command line or programmatically. For example:

Command Line:

```
dns-sd -R "rac service" _chassis._tcp local 5353
dns-sd -P _rac._tcp. local 5353 chassis 192.168.1.10
```

Programmatically:

```
try {
  String RACIP =
  CMCHostIP.substring(0,CMCHostIP.lastIndexOf(".")+1);
  int num =
  Integer.parseInt(CMCHostIP.substring(CMCHostIP.lastIndexOf(".") +
  1));
  /*
  * Create 16 RAC IP for 16 Blades
  */
  for (int i = 1; i <= 16; i++) {
    String BladeIP = RACIP.concat(String.valueOf(num + i));
    System.out.println("Registering Blade " + i + " with RAC IP = " +
  BladeIP);
    InetAddress inetAddress = InetAddress.getByName(BladeIP);
    jmdns = JmDNS.create(inetAddress);
    ServiceInfo RACService = ServiceInfo.create(Servicetype,
    "RAC Service for Blade " + i + " ", 5353, "rac
    service");
    jmdns.registerService(RACService);
jmdns.addServiceListener(Servicetype, listener = new
ServiceListener( ) {
    public void serviceResolved(ServiceEvent ev) {
        System.out.println("Service resolved: "
        + ev.getInfo( ).getQualifiedName( )
        + " port:" + ev.getInfo( ).getPort( ));
        InetAddress[ ] addresses = null;
        try {
            addresses =
            InetAddress.getAllByName(ev.getInfo( ).
            getQualifiedName( ));
        } catch (UnknownHostException e) { }
        for (InetAddress address : addresses) {
            System.out.println(address.getHostAddress( ));
        }
    }
    public void serviceRemoved(ServiceEvent ev) {
    }
    public void serviceAdded(ServiceEvent event) {
        jmdns.requestServiceInfo(event.getType( ),
        event.getName( ), 1);
    }
```

-continued

```
    });
  }
} catch(Exception e) {
    e.printStackTrace( );
}
```

In various embodiments, the services associated with a device, such as a server chassis, or its associated servers, are registered whenever the device is added to a network. In certain embodiments, services associated with a device are registered whenever the services are implemented for the device. As an example, a new service may be added to a server chassis, or its associated servers, that have services that have been previously registered.

Browsing operations are then performed in step 806 to identify available services and resolve the RAC service of the server chassis, and each of its associated servers, to an actual IP address. In various embodiments, the RAC service associated with a server chassis, or its associated servers, are browsed. In these and other embodiments, browsing for available services may be done from the command line or programmatically. For example:

Command Line:
dns-sd -B _rac._tcp
Programmatically:

```
public static class ServiceListenerClass implements ServiceListener {
    public void serviceAdded(ServiceEvent event) {
        event.getDNS( ).requestServiceInfo(event.getInfo( ).getServer( ),
        event.getName( ), true);
    }
    public void serviceRemoved(ServiceEvent event) {
        System.out.Println((--count) + " " +
        event.getInfo( ).getName( ));
    }
    public void serviceResolved(ServiceEvent event) {
        System.out.Println((++count) + " :Res: " " +
        event.getInfo( ).getName( ) + " " +
        event.getInfo( ).getPort( ) + " "
        + event.getInfo( ).getApplication( ) + " "
        + event.getInfo( ).getDomain( ) + " "
        + event.getInfo( ).getKey( ));
        for (InetAddress address :
        event.getInfo( ).getInetAddresses( ))
        System.out.Println(address.getHostAddress( ));
    }
}
```

Then, in step 808, the RAC IP address of the server chassis, and each of its associated servers, are automatically discovered. As an example, the IP address of the RAC may be automatically discovered through the implementation of the following programmatic approach:

```
String HostIP;
InetAddress[ ] addresses = null;
if (args.length < 1)
    HostIP = "localhost";
else
    HostIP = args[0];
try {
    addresses = InetAddress.getAllByName(HostIP);
} catch (UnknownHostException e) { }
for (InetAddress address : addresses) {
    System.out.Println(address.getHostAddress( ));
}
```

Thereafter, a determination is made in step 810 whether to continue RAC service discovery operations for a server chassis and each of its associated servers. If so, then the process is continued, proceeding with step 804. Otherwise, RAC discovery operations for a server chassis and each of its associated servers are ended in step 812.

As described in greater detail herein, Bonjour® and JmDNS are respectively implemented in various embodiments to send and receive network packets on UDP and TCP port 5353. Therefore, UDP port 5353, for Bonjour®, or TCP port 5353, for JmDNS, must be opened to allow them to work properly. However, as likewise described in greater detail herein, certain firewalls will only partially block Bonjour packets. As a result, firewall settings are checked in various embodiments to verify that Bonjour® is listed as an exception and is allowed to receive incoming packets. In certain embodiments, Bonjour® is implemented to configure a Windows® firewall appropriately during installation on Windows® XP® Service Pack 2 and above.

For example, the following programmatic steps are performed in step 804 to register a RAC service associated with a server chassis and each of its associated servers:

```
RegisterChassisRACService.java
import java.net.InetAddress;
import java.net.UnknownHostException;
import javax.jmdns.JmDNS;
import javax.jmdns.ServiceEvent;
import javax.jmdns.ServiceInfo;
import javax.jmdns.ServiceListener;
public class RegisterChassisRACService {
    private static JmDNS jmdns;
    public static void main(String[ ] args) {
        final String CMCHostIP;
        ServiceListener listener;
        /*
        * Pass CMC IP or default RAC IP to the program
        */
        if (args.length == 1)
            CMCHostIP = args[0];
        else
            CMCHostIP = "192.168.0.120";
        /*
        * Define the Service Type where it will convert to the
        formal form
        * e.g _type._protocol.local. i.e _cmc._tcp.local.
        */
        String Servicetype = "chassis";
        System.out.Println("Registering the RAC service for CMC
        from the Local Area Network");
        try {
            String RACIP = CMCHostIP.substring(0,
            CMCHostIP.lastIndexOf(".") + 1);
            int num =
            Integer.parseInt(CMCHostIP.substring(CMCHostIP.lastIndexOf(".") + 1));
            /*
            * Create 16 RAC IP for 16 Blades
            */
            for (int i = 1; i <= 16; i++) {
                String BladeIP =
                RACIP.concat(String.valueOf(num + i));
                System.out.Println("Registering Blade " + i +
                " with RAC IP = " + BladeIP);
                InetAddress inetAddress =
                InetAddress.getByName(BladeIP);
                jmdns = JmDNS.create(inetAddress);
                ServiceInfo RACService =
                ServiceInfo.create(Servicetype,
                        "RAC Service for Blade " + i + " ",
                5353, "idrac service");
                jmdns.registerService(RACService);
                jmdns.addServiceListener(Servicetype, listener =
                new ServiceListener( ) {
                        public void serviceResolved(ServiceEvent
                ev) {
                            System.out.Println("Service
resolved: "
                            +
```

```
                ev.getInfo( ).getQualifiedName( )
                                                + " port:" +
                ev.getInfo( ).getPort( ));
                                InetAddress[ ] addresses = null;
                                try {
                                        addresses =
        InetAddress.getAllByName(ev.getInfo( ).getQualifiedName( ));
                                } catch (UnknownHostException
        e) { }
                                for (InetAddress address :
        addresses) {
            System.out.Println(address.getHostAddress( ));
                                }
                            }
                            public void serviceRemoved(ServiceEvent
        ev) {
                            }
                            public void serviceAdded(ServiceEvent
        event) {
                jmdns.requestServiceInfo(event.getType( ), event.getName( ), 1);
                            }
                    });
                }
            } catch(Exception e) {
                e.printStackTrace( );
            }
        }
    }
```

Likewise, the programmatic steps described in the descriptive text associated with step 606 in FIG. 6 are performed in step 806 to browse available services and resolve a RAC service associated with a server chassis and each of its associated servers: The programmatic steps described in the descriptive text associated with step 608 in FIG. 6 are likewise performed in step 808 to automatically discover the IP address of a RAC service associated with a server chassis and each of each of its associated servers:

FIG. 9 shows the display of automatically-discovered remote access controller (RAC) service information associated with a server chassis and each of its associated servers within a user interface (UI) window implemented in accordance with an embodiment of the invention. In this embodiment, service types 704, associated services 706, and corresponding service details 702 are displayed within a UI window 702 as a result of performing the RAC service discovery operations described in the descriptive text associated with FIG. 8. For example, as shown in FIG. 9, _chassis.tcp.local. 910 is one of several service types 704 registered in the process of performing the operations described in the descriptive text associated with step 804 of FIG. 8. Likewise, associated services 706 may be browsed as described in the descriptive text associated with step 806 in FIG. 8 to select a corresponding RAC service, such as "RAC Service-Blade 16" 912, which is associated with an individual server associated with a server chassis. By doing so, service details 914 associated with "RAC Service-Blade 16" 912 are displayed within the UI window 702, such as its registration type (RegType) of "Blade 16 _rac.tcp.local." and its IP address details "192-168-0-120.local: 5353 /192.168.0.120.5353".

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for using Zero Configuration Networking (ZeroConf) to automate the discovery of the Internet Protocol (IP) network address of a remote access controller (RAC), comprising:

coupling a network device to a local network, the local network comprising a link-local network, the link-local network comprising a private network using a private Internet Protocol (IP) address space, the network device comprising a RAC service, the RAC service enabling access to the network device from a local host by directly entering a service name within a local space rather than specifying an IP address of the network device;

registering the RAC service associated with the network device, the registering comprising associating a registration type with a respective registered RAC service;

browsing available services comprising the registered RAC service;

resolving the registered RAC service to an IP network address; and discovering the IP network address of the registered RAC service, the discovering the IP network address of the registered RAC address being automated by performing a Zero Configuration Networking operation, the Zero Configuration Networking operation automatically creating a usable computer network based upon an Internet Protocol Suite when the RAC is coupled to the local network, the Zero Configuration Networking operation comprising link-local addressing, Multicast Name Resolution (mDNS) and DNS service Discovery (DNS-SD) functional capabilities.

2. The method of claim 1, wherein the network device is one of the set of:
a server;
a server chassis;
a host system; and
a network peripheral.

3. The method of claim 2, wherein:
the server chassis is associated with at least one server; and
the RAC IP address of the chassis server and the RAC IP address of the at least one server are discovered.

4. The method of claim 1, wherein:
the browsing is performed within a user interface (UI) window; and
the available services and the discovered IP address are displayed within the UI window.

5. The method of claim 1, wherein the registering is performed in response to user input to a command line interface.

6. The method of claim 1, wherein the registering is performed programmatically.

7. A system comprising:
a processor;
a data bus coupled to the processor; and
a non-transitory, computer-readable storage medium embodying computer program code for using Zero Configuration Networking (ZeroConf) to automate the discovery of the Internet Protocol (IP) network address of a remote access controller (RAC), the non-transitory, computer-readable storage medium being coupled to the data bus, the computer program code interacting with a plurality of computer operations and comprising instructions executable by the processor and configured for:
coupling a network device to a local network, the local network comprising a link-local network, the link-local network comprising a private network using a private Internet Protocol (IP) address space, the network device comprising a RAC service, the RAC service enabling access to the network device from a local host by directly entering a service name within a local space rather than specifying an IP address of the network device;
registering the RAC service associated with the network device, the registering comprising associating a registration type with a respective registered RAC service;
browsing available services comprising the registered RAC service;
resolving the registered RAC service to an IP network address; and
discovering the IP network address of the registered RAC service, the discovering the IP network address of the registered RAC address being automated by performing a Zero Configuration Networking operation, the Zero Configuration Networking operation automatically creating a usable computer network based upon an Internet Protocol Suite when the RAC is coupled to the local network, the Zero Configuration Networking operation comprising link-local addressing, Multicast Name Resolution (mDNS) and DNS service Discovery (DNS-SD) functional capabilities.

8. The system of claim 7, wherein the network device is one of the set of:
a server;
a server chassis;
a host system; and
a network peripheral.

9. The system of claim 8, wherein:
the server chassis is associated with at least one server; and
the RAC IP address of the chassis server and the RAC IP address of the at least one server are discovered.

10. The system of claim 7, wherein:
the browsing is performed within a user interface (UI) window; and
the available services and the discovered IP address are displayed within the UI window.

11. The system of claim 7, wherein the registering is performed in response to user input to a command line interface.

12. The system of claim 7, wherein the registering is performed programmatically.

13. A non-transitory, computer-readable storage medium embodying computer program code for using Zero Configuration Networking (ZeroConf) to automate the discovery of the Internet Protocol (IP) network address of a remote access controller (RAC), the computer program code comprising computer executable instructions configured for:
coupling a network device to a local network, the local network comprising a link-local network, the link-local network comprising a private network using a private Internet Protocol (IP) address space, the network device comprising a RAC service, the RAC service enabling access to the network device from a local host by directly entering a service name within a local space rather than specifying an IP address of the network device;
registering the RAC service associated with the network device, the registering comprising associating a registration type with a respective registered RAC service;
browsing available services comprising the registered RAC service;
resolving the registered RAC service to an IP network address; and
discovering the IP network address of the registered RAC service, the discovering the IP network address of the registered RAC address being automated by performing a Zero Configuration Networking operation, the Zero Configuration Networking operation automatically creating a usable computer network based upon an Internet Protocol Suite when the RAC is coupled to the local network, the Zero Configuration Networking operation comprising link-local addressing, Multicast Name Resolution (mDNS) and DNS service Discovery (DNS-SD) functional capabilities.

14. The non-transitory, computer-readable storage medium of claim 13, wherein the network device is one of the set of:
a server;
a server chassis;
a host system; and
a network peripheral.

15. The non-transitory, computer-readable storage medium of claim 14, wherein:
the server chassis is associated with at least one server; and
the RAC IP address of the chassis server and the RAC IP address of the at least one server are discovered.

16. The non-transitory, computer-readable storage medium of claim 13, wherein:
the browsing is performed within a user interface (UI) window; and the available services and the discovered IP address are displayed within the UI window.

17. The non-transitory, computer-readable storage medium of claim 13, wherein the registering is performed in response to user input to a command line interface.

18. The non-transitory, computer-readable storage medium of claim 13, wherein the registering is performed programmatically.

19. A computer-implementable method for using Zero Configuration Networking (ZeroConf) to automate the discovery of the Internet Protocol (IP) network address of a remote access controller (RAC), comprising:

coupling a network device to a local network, the local network comprising a link-local network, the link-local network comprising a private network using a private Internet Protocol (IP) address space, the network device comprising a RAC service, the RAC service enabling access to the network device from a local host by directly entering a service name;

registering the RAC service associated with the network device, the registering comprising associating a registration type with a respective registered RAC service;

browsing available services comprising the registered RAC service;

resolving the registered RAC service to an IP network address; and discovering the IP network address of the registered RAC service, the discovering the IP network address of the registered RAC address being automated by performing a Zero Configuration Networking operation, the Zero Configuration Networking operation automatically creating a usable computer network based upon an Internet Protocol Suite when the RAC is coupled to the local network, the Zero Configuration Networking operation comprising link-local addressing, Multicast Name Resolution (mDNS) and DNS service Discovery (DNS-SD) functional capabilities; and wherein the network device comprises a server chassis associated with at least one server;

the RAC IP address of the server chassis and the RAC IP address of the at least one server are discovered;

the browsing is performed within a user interface (UI) window; and, service types, the available services and the discovered IP address are displayed within the UI window, an available service and a discovered IP address being associated with a service type within the UI window.

* * * * *